No. 713,306. Patented Nov. 11, 1902.
W. H. JACOBY.
FISH HOOK.
(Application filed May 9, 1902.)

(No Model.)

Witnesses
E. G. Strause
O. G. Hanson

Inventor
William H. Jacoby
By Paul & Paul,
his attorneys

UNITED STATES PATENT OFFICE.

WILLIAM H. JACOBY, OF MINNEAPOLIS, MINNESOTA.

FISH-HOOK.

SPECIFICATION forming part of Letters Patent No. 713,306, dated November 11, 1902.

Application filed May 9, 1902. Serial No. 106,519. (No model.)

*To all whom it may concern:*

Be it known that I, WILLIAM H. JACOBY, of Minneapolis, Hennepin county, Minnesota, have invented certain new and useful Improvements in Fish-Hooks, of which the following is a specification.

My invention relates to fish-hooks, and particularly to that kind known as "weedless" hooks, being those provided with means for preventing the barb from catching on the grass, weeds, or other obstructions.

In fishing it frequently happens that a hook, with or without a weed-guard, will slip through the fish's mouth without the barb catching the jaw, resulting in the loss of the fish.

The object of my invention is to provide means for causing the shank of the hook to turn or twist and swing the barb to one side as the hook is being drawn through the mouth of the fish, insuring the point of the barb catching the fish's mouth, usually the upper jaw.

The invention consists generally in providing a fish-hook shank with laterally-arranged wings that are curved slightly to cause a turning of the shank when the hook is drawn through the mouth of a fish.

Further, the invention consists in providing a spring weed-guard terminating at a point near the point of the barb and in combination with the laterally-arranged wings.

Figure 1:
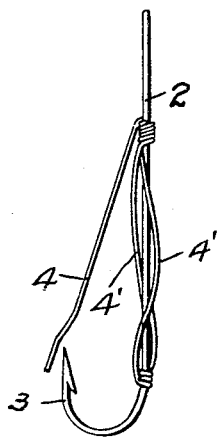
Figure 2:
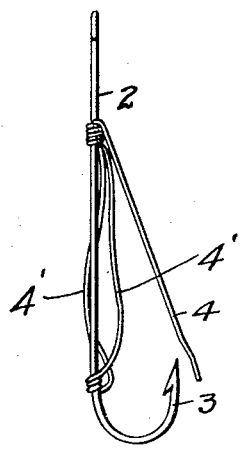
Figure 3:
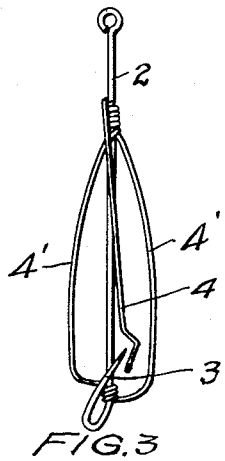

In the accompanying drawings, forming part of this specification, Figure 1 is a plan view of a fish-hook embodying my invention. Fig. 2 is a similar view of the other side of the hook. Fig. 3 is a plan view with the barb turned toward the front.

In the drawings, 2 represents a fish-hook shank having suitable means for securing a line thereto and provided with the usual barb-point 3.

4 is a weed-guard, preferably of wire, secured at one end to the shank and extending down toward the barb and terminating at a point near one side of the same, but out of contact therewith. The guard also preferably extends across the path of the barb and in advance of it. This guard serves to protect the point of the hook from coming in contact with sticks or stones and will prevent it from catching any grass or weeds, but at the same time will yield readily to allow the hooking of a fish. The free end of the guard when pressure is applied will move in toward the point of the barb, but will not prevent the point of the barb from catching the mouth of the fish. The shank of the hook is provided, preferably upon each side, with laterally-extending wings 4', preferably of spring-wire, secured at their ends to the shank and curved spirally to cause the hook to turn while it is being drawn through the mouth of the fish that has taken the bait. I prefer to bring the ends of the wings near the upper end of the shank and cause the opposite ends to gradually diverge therefrom until they reach a point on the shank substantially opposite the barb, where they are inwardly turned at nearly right angles and secured. As the fish is struggling to take the bait and get away from the hook the fisherman drawing on the line will pull the hook through the mouth of the fish, and should the hook be lying flat it will be practically impossible for it to be drawn out of the mouth without the wings causing the shank to turn sufficiently for the barb to catch the jaw, the spring-guard being easily pressed to one side to expose the point of the barb. In this way the hooking of every fish that takes the bait and hook in its mouth is practically assured.

I claim as my invention—

1. As a new article of manufacture, a fish-hook provided on its shank with a spirally-curved laterally-extending wing.

2. As a new article of manufacture, a fish-hook provided on its shank with a curved laterally-extending wing, secured at or near each end to the shank, and a spring-guard secured to said shank and having its free end opposite and near the barb.

3. As a new article of manufacture a fish-hook provided on its shank with two spirally-arranged laterally-extending wings which when the hook is drawn through the mouth of a fish will cause the shank to turn and the barb to engage the jaw.

4. As a new article of manufacture, a fish-hook provided with laterally-extending wings of spring-wire, spirally arranged and secured at their ends to the shank, and a spring-wire guard secured at one end to the shank and having its free end opposite and near the barb of the hook.

5. As a new article of manufacture, a fish-hook provided with laterally-extending spring-wire wings curved in long spirals and secured at their ends to the shank and causing the shank to turn when the hook is drawn through the mouth of a fish to insure the barb catching the jaw.

6. In a new article of manufacture, a fish-hook provided with laterally-extending wings having their ends secured to the hook-shank, the edges of said wings having compound curves, which when the hook is drawn through the mouth of a fish, will cause the shank to turn and the barb to engage the jaw.

In witness whereof I have hereunto set my hand this 5th day of May, 1902.

WILLIAM H. JACOBY.

In presence of—
RICHARD PAUL,
C. G. HANSON.